United States Patent
Kagami et al.

(10) Patent No.: US 9,524,834 B2
(45) Date of Patent: Dec. 20, 2016

(54) MULTI-DIRECTIONAL SWITCH AND OPERATION INPUT DEVICE

(71) Applicant: MITSUMI ELECTRIC CO., LTD., Tokyo (JP)

(72) Inventors: Masaharu Kagami, Tokyo (JP); Shigenori Inamoto, Tokyo (JP); Kenichi Furukawa, Tokyo (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 97 days.

(21) Appl. No.: 14/368,885

(22) PCT Filed: Dec. 27, 2012

(86) PCT No.: PCT/JP2012/083791
§ 371 (c)(1),
(2) Date: Jun. 26, 2014

(87) PCT Pub. No.: WO2013/100012
PCT Pub. Date: Jul. 4, 2013

(65) Prior Publication Data
US 2014/0353132 A1    Dec. 4, 2014

(30) Foreign Application Priority Data
Dec. 28, 2011 (JP) ................. 2011-289813

(51) Int. Cl.
*H01H 15/10* (2006.01)
*H01H 25/00* (2006.01)
*G06F 3/0354* (2013.01)

(52) U.S. Cl.
CPC .......... *H01H 15/10* (2013.01); *G06F 3/03548* (2013.01); *H01H 25/002* (2013.01);
(Continued)

(58) Field of Classification Search
CPC .................. H01H 15/10; H01H 3/38
(Continued)

(56) References Cited

U.S. PATENT DOCUMENTS

2001/0030113 A1* 10/2001 Toshiharu ........... G06F 3/03548
                                                   200/5 R
2007/0278084 A1   12/2007 Kawamura et al.

FOREIGN PATENT DOCUMENTS

JP      10-241499      9/1998
JP      2003-084916    3/2003
(Continued)

*Primary Examiner* — Edwin A. Leon
*Assistant Examiner* — Iman Malakooti
(74) *Attorney, Agent, or Firm* — Whitham, Curtis & Cook, P.C.

(57) ABSTRACT

A sliding space is defined between a first housing and a second housing. The slider has at least a portion arranged within a sliding space, and is configured to two-dimensionally slide within the sliding space in response to an operating force. The first housing and the slider defines an accommodation space having a point-symmetrical shape therebetween. An elastic member having a circular outer edge is arranged within the accommodation space. An outer edge of the elastic member abuts against an inner peripheral surface of the accommodation space (30) in a state where no operating force is applied to the slider. The elastic member is compressed by a portion of the inner peripheral surface of the accommodation space as the slider slides within the sliding space.

11 Claims, 10 Drawing Sheets

(52) U.S. Cl.
CPC . *H01H 2221/044* (2013.01); *H01H 2221/088* (2013.01); *H01H 2235/01* (2013.01)

(58) Field of Classification Search
USPC .................................................. 200/252, 5 R
See application file for complete search history.

(56) References Cited

FOREIGN PATENT DOCUMENTS

| | | | |
|---|---|---|---|
| JP | 2003-173904 | | 6/2003 |
| JP | 2005310670 A | * | 11/2005 |
| JP | 3814279 | | 8/2006 |
| JP | 2007-323942 | | 12/2007 |

* cited by examiner

MULTI-DIRECTIONAL SWITCH AND OPERATION INPUT DEVICE

TECHNICAL FIELD

The present invention relates to a multi-directional switch including a slider that moves two-dimensionally in response to an operating force, and an operation input device including the same.

BACKGROUND ART

As this type of switch, switches in which an annular elastic member is used as means for returning a slider to its initial position when an operating force is released are known (refer to PTLs 1 and 2).

CITATION LIST

Patent Literature

[PTL 1]: Japanese Patent Publication No. 2003-84916
[PTL 2]: Japanese Patent No. 3814279

SUMMARY OF INVENTION

Technical Problem

In a configuration described in PTL 1, an O-ring as an annular elastic member is arranged along an inner peripheral wall of a sliding space along which a slider is configured to be two-dimensionally slidable. The slider made to slide in a direction of an operating force is configured to crush the O-ring at a tip in a traveling direction, and the slider is configured to be pushed back to its initial position by the elastic restoring force of the O-ring with the release of the operating force. Since an outer peripheral portion of the slider needs to always be in contact with the O-ring, the movable distance of the slider, that is, the operational amount (stroke) permitted by a user becomes only a crushable amount of the O-ring. If the thickness of the O-ring is increased in order for the operational amount to be enlarged, a large force is required for elastic deformation, and thus operativity is impaired.

In a configuration described in PTL 2, an annular coil spring as the annular elastic member is arranged along an outer peripheral surface of a slider. The slider made to slide in a direction of an operating force is configured to stretch the annular coil spring in a traveling direction, and the slider is configured to be pushed back to its initial position by the elastic restoring force of the annular coil spring with the release of the operating force. Although the slider can be made to slide until the annular coil spring stretched in the traveling direction abuts against an inner peripheral wall of a sliding space, the stroke is limited by the thickness of the annular coil spring.

Additionally, in the configuration described in PTL 2, when the slider is arranged within the sliding space defined by an upper housing and a lower housing, it is necessary to make a jig inserted from a hole provided in the upper housing temporarily hold the annular coil spring, and an improvement in assembly workability is hindered.

Hence, an object of the invention is to provide a technique capable of making the operational amount (stroke) of a multi-directional switch, that is, the movable distance of a slider, as large as possible, and capable of improving operativity and assembly workability.

Solution to Problem

A first aspect of the invention for solving the above problems is a multi-directional switch comprising:
a first housing;
a second housing defining a sliding space between the second housing and the first housing;
a slider, having at least a portion thereof arranged within the sliding space, and configured to two-dimensionally slide within the sliding space in response to an operating force; and
an elastic member having a circular outer edge,
wherein the first housing and the slider defines an accommodation space having a point-symmetrical shape therebetween,
wherein the elastic member is arranged within the accommodation space,
wherein the outer edge of the elastic member abuts against an inner peripheral surface of the accommodation space in a state where no operating force is applied to the slider, and
wherein the elastic member is compressed by a portion of the inner peripheral surface of the accommodation space as the slider slides within the sliding space.

According to such a configuration, since a slidable region has no means for suppressing the operational amount, the size of the slidable area can be utilized as the operational amount to the maximum amount. That is, the stroke of the multi-directional switch can be enlarged. On the other hand, since it is possible to enlarge the width dimension of the slider instead of enlarging the operational amount, clattering of the slider during operation can be reduced, and this contributes to an improvement in operativity.

An annular coil spring is included as an example of the elastic member. In this case, the stress to be generated with compression can be decentralized to the entire annular coil spring. Hence, a maximum stress value becomes low, and a structure that does not easily break due to fatigue can be provided. Moreover, since the allowed deformation volume of the elastic member can be made large, this also contributes to extension of the operational amount.

In a configuration in which the center diameter of the annular coil spring in a state where the annular coil spring is not arranged within the accommodation space is smaller than the width dimension of the accommodation space in a sliding direction of the slider, the annular coil spring sandwiched between the first housing and the slider can be easily made to slide into the accommodation space. Since the arrangement of the annular coil spring to the accommodation space is completed only by the work of pressing the slider against the elastic member placed on the first housing, workability can be substantially improved. This function is similarly obtained if an annular elastic member is provided.

A configuration may be adopted in which the elastic member has a first width dimension in a state where the elastic member is not arranged within the accommodation space and in which the accommodation space has a second width dimension smaller than the first width dimension in the sliding direction of the slider, the accommodation space is defined by a first recess formed in the first housing and a second recess formed in the slider, and corners that form opening edges of the first recess and the second recess are right-angled, respectively.

In this case, the elastic member compressed by being housed in the accommodation space can be prevented from riding over the opening edges of the respective recesses and coming out during sliding of the slider, and a stable elastic restoring force can be applied to the slider.

By including the signal output unit that outputs a signal according to the position of the slider, the above multi-directional switch can be made to function as an operation input device.

A second aspect of the invention for solving the above problems is a multi-directional switch comprising:

a housing having an opening having a point-symmetrical shape;

a first slider, having at least a portion arranged within the housing, and configured to two-dimensionally slide in response to an operating force;

a second slider arranged out of the housing and sandwiching a portion of the housing including the opening together with the first slider; and an elastic member having a circular outer edge, wherein the first slider and the second slider define an accommodation space having a point-symmetrical shape therebetween, wherein the elastic member is arranged within the accommodation space, wherein the outer edge of the elastic member abuts against an inner peripheral surface of the accommodation space and an inner peripheral edge of the opening in a state where no operating force is applied to the first slider, and wherein the elastic member is compressed by a portion of the inner peripheral surface of the accommodation space and the inner peripheral edge of the opening as the first slider slides within the sliding space.

According to such a configuration, since a slidable region has no means for suppressing the operational amount, the size of the slidable area can be utilized as the operational amount to the maximum. That is, the stroke of the multi-directional switch can be enlarged. On the other hand, since it is possible to enlarge the width dimension of the first slider instead of enlarging the operational amount, clattering of the first slider during operation can be reduced, and this contributes to an improvement in operativity.

An annular coil spring is included as an example of the elastic member. In this case, the stress to be generated with compression can be decentralized to the entire annular coil spring. Hence, a maximum stress value becomes low, and a structure that does not easily break due to fatigue can be provided. Moreover, since the allowed deformation volume of the elastic member can be made large, this also contributes to extension of the operational amount.

In a configuration in which the center diameter of the annular coil spring in a state where the annular coil spring is not arranged within the accommodation space is smaller than the width dimension of the accommodation space in a sliding direction of the first slider, the annular coil spring sandwiched between the housing and the second slider can be easily made to slide into the accommodation space. Since the arrangement of the elastic member to the accommodation space is completed only by the work of pressing the second slider against the annular coil spring placed on the opening of the housing, workability can be substantially improved. This function is similarly obtained if an annular elastic member is provided.

A configuration may be adopted in which the elastic member has a first width dimension in a state where the elastic member is not arranged within the accommodation space, the accommodation space has a second width dimension smaller than the first width dimension in the sliding direction of the first slider, the accommodation space is defined by a first recess formed in the first slider and a second recess formed in the second slider, and corners that form an opening edge of the second recess and an edge of an opening of the housing are right-angled, respectively.

In this case, the elastic member compressed by being housed in the accommodation space can be prevented from riding over the opening edges of the respective recesses and corning out during sliding of the first slider, and a stable elastic restoring force can be applied to the first slider.

In a configuration in which the opening of the housing is covered with the second slider in a state where no operating force is applied to at least the first slider, entering of dust or the like into the inside from the opening can be prevented as much as possible.

By including the signal output unit that outputs a signal according to the position of the first slider, the above multi-directional switch can be made to function as an operation input device.

Advantageous Effects of Invention

According to the invention, the stroke of a multi-directional switch can be enlarged to the maximum, and operativity and assembly workability can be improved.

DESCRIPTION OF EMBODIMENTS

Embodiments of the invention will be described below in detail, referring to the attached drawings. In addition, in the respective drawings to be used for the following description, scales of respective members are appropriately changed in order to make the respective members have recognizable sizes. Additionally, expressions related to "up and down", "left and right", and "front and rear" in the following description are merely used for convenience in the description that refers to the drawings, and are not intended to limit the directions when a product is used.

Figure 1:
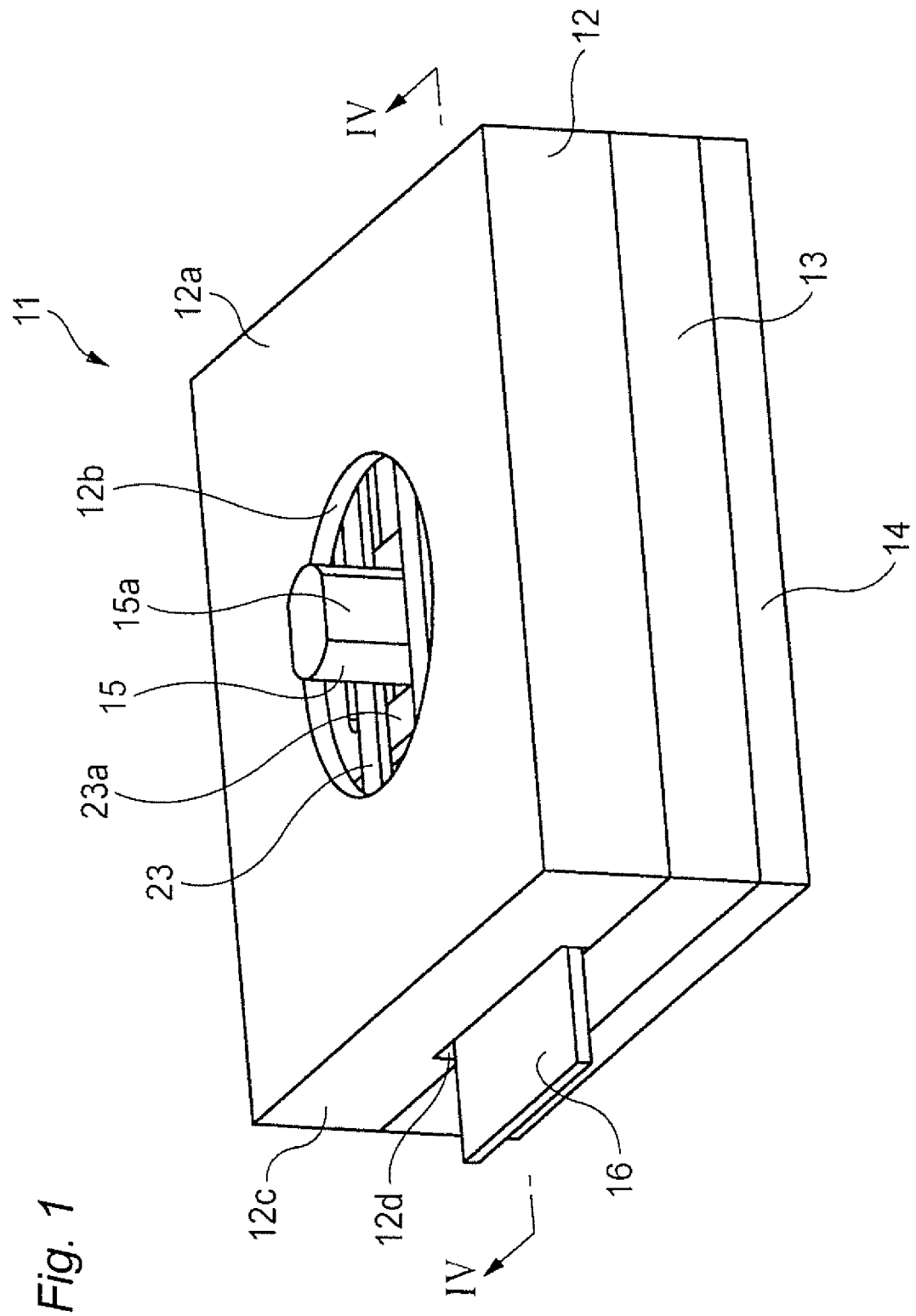
FIG. 1 is a perspective view showing the outer shape of a multi-directional switch related to a first embodiment of the invention.

FIG. 1 is a perspective view showing the outer shape of a multi-directional switch 11 related to a first embodiment of the invention. In the multi-directional switch 11, an upper case 12, a middle case 13, and a lower case 14 are stacked to form a rectangular parallelepiped-shaped main body.

The upper surface 12a of the upper case 12 is formed with a circular opening 12b, and an operating portion 15 extends upward from the opening 12b. The operating portion 15 is a portion to which an operating force exerted by a user is directly or indirectly input.

A left side surface 12c of the upper case 12 is formed with a rectangular opening 12d, and a connector portion 16 extends laterally from the opening 12d. The connector portion 16 is provided with an external connection terminal (not shown).

Figure 2:
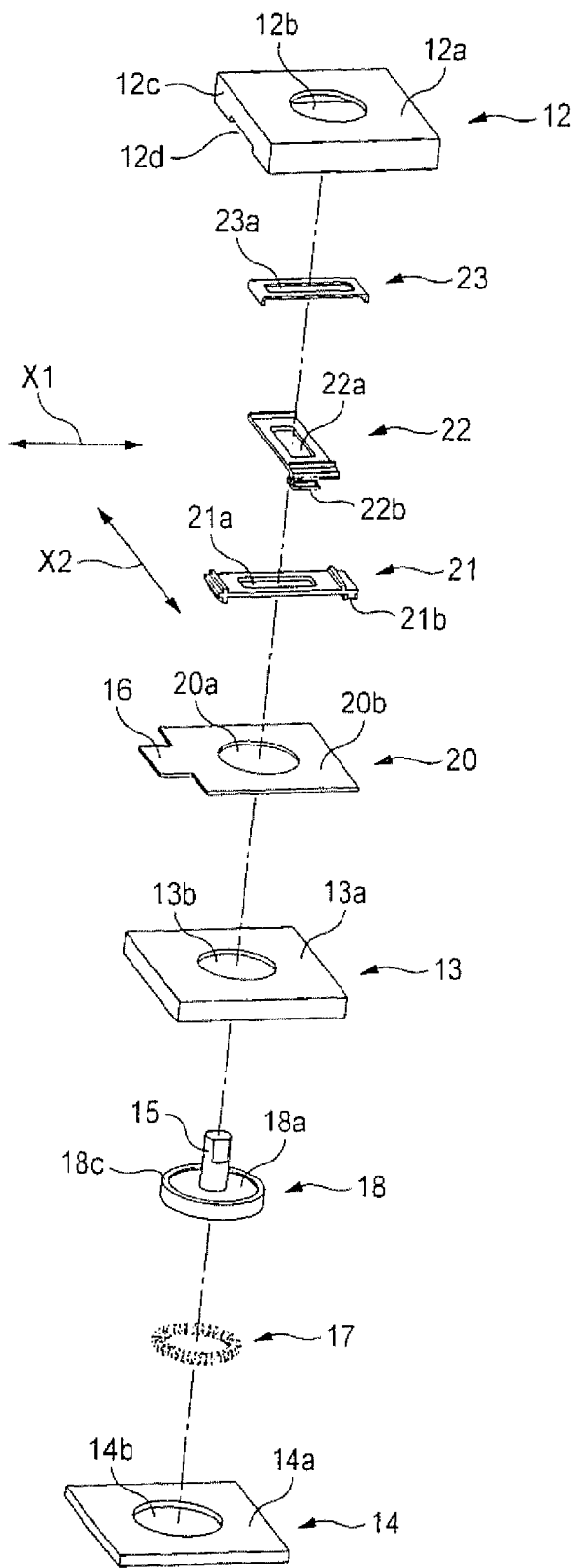
FIG. 2 is an exploded perspective view showing the internal configuration of the multi-directional switch of FIG. 1.

Next, the internal configuration of the multi-directional switch 11 will be described with reference to FIGS. 2 to 4B. As shown in FIG. 2, the multi-directional switch 11 further includes an annular coil spring 17, a slider 18, a circuit board 20, a first slide terminal 21, a second slide terminal 22, and a holding member 23.

Figure 3A:
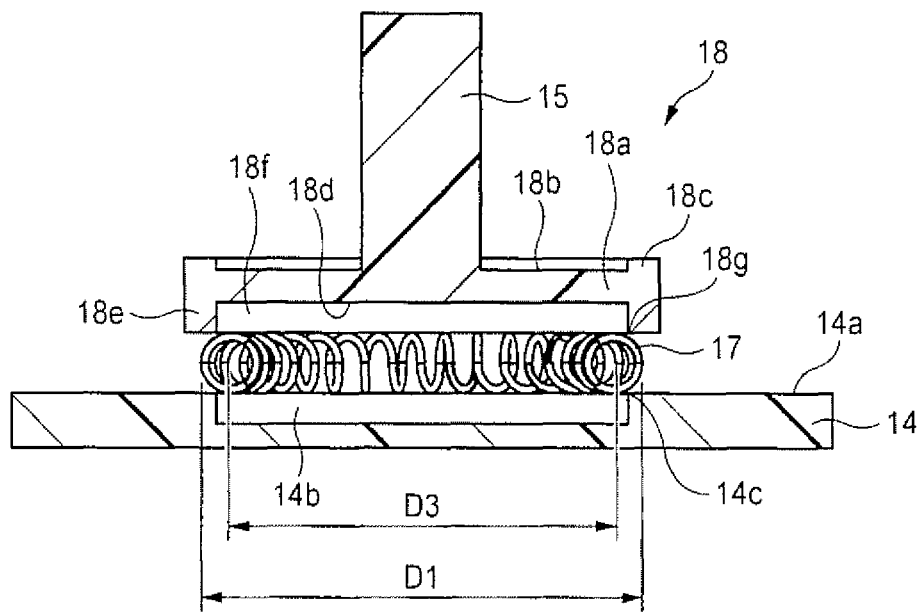
FIGS. 3A and 3B are longitudinal cross-sectional views illustrating a method of mounting an annular coil spring in the multi-directional switch of FIG. 1.

As shown in FIG. 2 and FIG. 3A, an upper surface 14a of the lower case 14 is a bottomed recess 14b having a circular shape in a plan view.

The annular coil spring 17 has an annular outer shape by coupling both ends of a compression coil spring, and is formed so as to have a circular outer edge.

The slider 18 has a disk-like main body 18a. The above-described operating portion 15 extends from an upper surface 18b of the main body 18a. That is, the operating portion 15 constitutes a portion of the slider 18. An outer peripheral portion of the upper surface 18b protrudes upward to form an upper peripheral wall 18c. An outer peripheral portion of a lower surface 18d of the main body 18a protrudes downward to form a lower peripheral wall 18e. A bottomed recess 18f having a circular shape in a plan view is defined on a lower surface 18d side by the lower peripheral wall 18e.

Figure 3B:
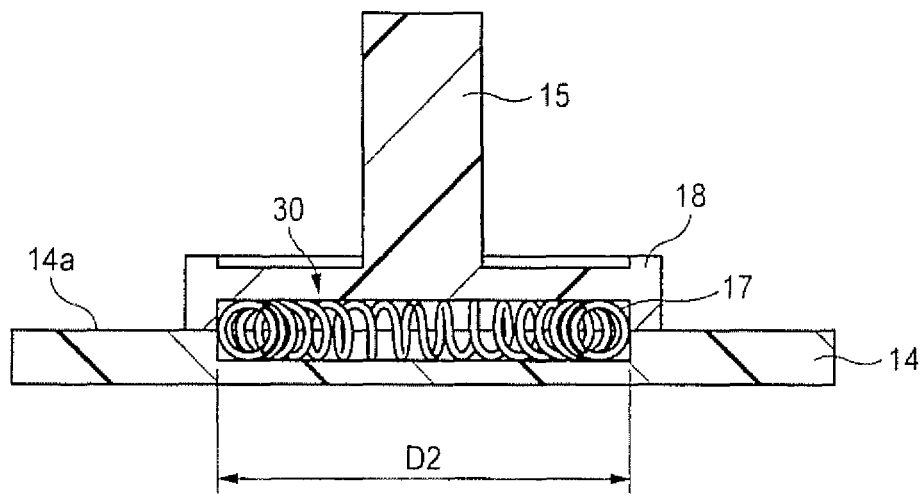

As shown in FIG. 3B, an accommodation space 30 is defined between the lower case 14 and the slider 18 by the recess 14b and the recess 18f by placing the slider 18 on the upper surface 14a of the lower case 14 as a first housing of the invention. The annular coil spring 17 as an elastic member of the invention is arranged within the accommodation space 30.

In addition, as shown in FIG. 3A, the annular coil spring 17 has an external diameter D1 in a state where the annular coil spring is not arranged in the accommodation space 30. Meanwhile, as shown in FIG. 3B, the accommodation space 30 has an external diameter D2 smaller than the external diameter D1 of the annular coil spring 17. The external diameter D2 refers to the diameter in the accommodation space 30 having a circular shape in a plan view. In other words, the external diameter refers to the width dimension of the accommodation space 30 in a sliding direction of the slider 18 to be described below.

Additionally, the annular coil spring 17 has a center diameter D3 in a state where the annular coil spring is not arranged in the accommodation space 30. The center diameter D3 refers to the length of a line segment that passes through the center of the annular coil spring 17 and connects the turning centers of portions around which the spring turns annularly.

Additionally, a corner 14c that forms an opening edge of the recess 14b as a first recess of the invention is made right-angled. Moreover, a corner 18g that forms an opening edge of the recess 18f as a second recess of the invention is also made right-angled.

In order to arrange the annular coil spring 17 within the accommodation space 30, first, as shown in FIG. 3A, the annular coil spring 17 is placed above the recess 14b. Since the external diameter D1 of the annular coil spring 17 in this state is greater than the external diameter D2 of the accommodation space 30, that is, the external diameter of the recess 14b, the annular coil spring 17 is arranged so as to cover the corner 14c of the recess 14b.

Next, the annular coil spring 17 is pressed down by the slider 18 from above. Since the external diameter D1 of the annular coil spring 17 in this state is greater than the external diameter D2 of the accommodation space 30, that is, the external diameter of the recess 18f, the corner 18g of the recess 18f abuts against an upper portion of the annular coil spring 17.

As the slider 18 is pushed down, the annular coil spring 17 is compressed inwardly while being sandwiched between the corner 18g of the recess 18f and the corner 14c of the recess 14b, and is arranged within the accommodation space 30 defined by the recess 14b and the recess 18f.

Since the center diameter D3 of the annular coil spring 17 is smaller than the external diameter D2 of the accommodation space 30, the annular coil spring 17 sandwiched between the corner 14c and the corner 18g can be made to slide easily within the accommodation space 30. Since the arrangement of the annular coil spring 17 to the accommodation space 30 is completed only by the work of pressing the slider 18 against the annular coil spring 17 placed on the upper surface 14a of the lower case 14, workability can be substantially improved.

Figure 4A:
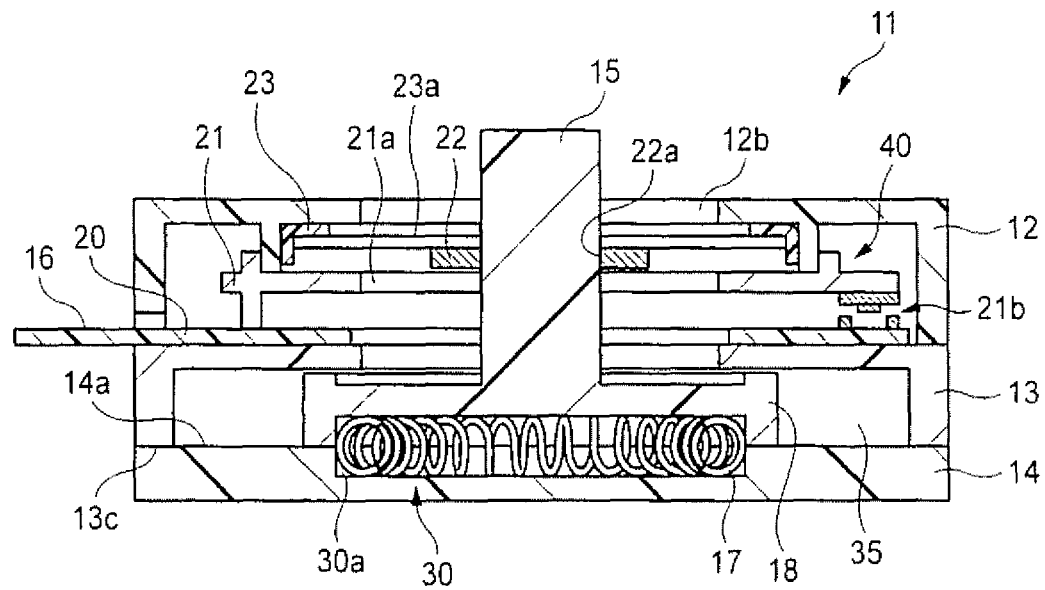
FIGS. 4A and 4B are longitudinal cross-sectional views taken along line IV-IV of FIG. 1, and illustrates the operation of the multi-directional switch.

As shown in FIG. 2, an upper surface 13a of the middle case 13 is formed with an opening 13b having a circular shape in a plan view. As shown in FIG. 4A, as a lower end face 13c of the middle case 13 is arranged on the upper surface 14a of the lower case 14, the middle case 13 as a second housing of the invention defines a sliding space 35 between the middle case and the lower case 14.

The slider 18 is arranged within the sliding space 35 except for a portion of the operating portion 15, and is configured to be two-dimensionally slidable within the sliding space 35 in response to an operating force applied to the operating portion 15. A portion of the operating portion 15 protrudes to the outside of the middle case 13 through the opening 13b.

As shown in FIG. 2, the circuit board 20 is formed with an insertion hole 20a. A portion of the circuit board 20 serves as the connector portion 16, and a circuit electrically connected to the external connection terminal provided at the connector portion 16 is mounted on an upper surface 20a of the circuit board 20. As shown in FIG. 4A, the circuit board 20 is arranged on the upper surface 13a of the middle case 13. A portion of the operating portion 15 protrudes above the circuit board 20 through the insertion hole 20a.

As shown in FIGS. 2 and 4A, the first slide terminal 21 is an elongated member arranged so as to extend in a left-and-right direction X1 of the multi-directional switch 11 above the circuit board 20. The first slide terminal 21 is formed with an insertion groove 21a extending in a longitudinal direction of the first slide terminal. Additionally, a conductive contact 21b is provided on a lower surface of one end in the longitudinal direction of the first slide terminal 21.

As shown in FIG. 2, the second slide terminal 22 is an elongated member arranged so as to extend in a front-and-rear direction X2 of the multi-directional switch 11 above the first slide terminal 21. The second slide terminal 22 is formed with an insertion groove 22a extending in a longitudinal direction of the second slide terminal. Additionally, a conductive contact 22b is provided on a lower surface of one end in the longitudinal direction of the second slide terminal 22.

The holding member 23 is an elongated member arranged so as to extend in the left-and-right direction X1 of the multi-directional switch 11 above the second slide terminal 22. The holding member 23 is formed with an insertion groove 23a extending in a longitudinal direction of the fixing member. In a state (refer to FIG. 1) where the holding member 23 is accommodated within the upper case 12, an inner edge of the insertion groove 23a is arranged so as to face a flat portion 15a formed at an upper end of the operating portion 15, to regulate a movement around the axis of the operating portion 15.

In an assembled state of the multi-directional switch 11 shown in FIG. 4A, the first slide terminal 21 is supported within the upper case 12 so as to be movable in the front-and-rear direction X2 of the multi-directional switch 11. Additionally, the second slide terminal 22 is supported within the upper case 12 so as to be movable in the left-and-right direction X1 of the multi-directional switch 11. The operating portion 15 extends upward through the insertion groove 21a of the first slide terminal 21, the insertion groove 22a of the second slide terminal 22, and the insertion groove 23a of the holding member 23, and protrudes upward from the opening 12b of the upper case 12.

As the operating member 15 is operated in the front-and-rear direction X2 of the multi-directional switch 11, the operating member 15 abuts against an inner edge of the insertion groove 21a formed in the first slide terminal 21, and moves the first slide terminal 21 in the front-and-rear direction X2 of the multi-directional switch 11. The contact 21b of the first slide terminal 21 slides on a conductive pattern (not shown) formed on an upper surface 20b of the circuit board 20, and a signal according to the position of the contact is output from the connector portion 16.

As the operating member 15 is operated in the left-and-right direction X1 of the multi-directional switch 11, the operating member 15 abuts against an inner edge of the insertion groove 22a formed in the second slide terminal 22, and moves the second slide terminal 22 in the left-and-right direction X1 of the multi-directional switch 11. The contact 22b of the second slide terminal 22 slides on the conductive pattern (not shown) formed on the upper surface 20b of the circuit board 20, and a signal according to the position of the contact is output from the connector portion 16.

That is, the circuit board 20, the first slide terminal 21, and the second slide terminal 22 function as a signal output unit 40 that outputs a signal according to the position of the slider 18 that slides two-dimensionally within the sliding space 35 by the operating force applied to the operating portion 15. The multi-directional switch 11 related to the present embodiment at this time functions as an operation input device that outputs a signal according to an operation input to the operating portion 15.

Next, the operation of the multi-directional switch 11 related to the present embodiment will be described, referring to FIGS. 4A to 58B.

As shown in FIG. 4A, in a state where no operating force is applied to the operating portion 15, that is, the slider 18, the outer edge of the annular coil spring 17 compressed and arranged within the accommodation space 30 abuts against an inner peripheral surface 30a of the accommodation space 30.

Figure 4B:
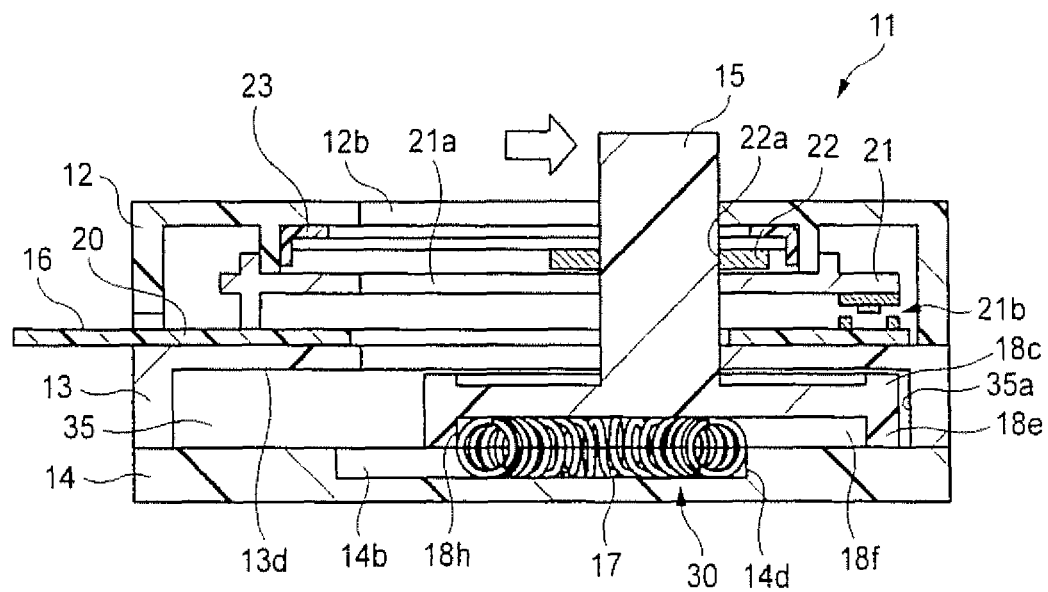

As shown in FIG. 4B, when a rightward operating force is applied to the operating portion 15, the slider 18 slides rightward within the sliding space 35. The operating portion 15 abuts against the insertion groove 22a of the second slide terminal 22, and moves the second slide terminal 22 rightward. The contact 22b provided on the second slide terminal 22 slides on the conductive pattern (not shown) formed on the circuit board 20, and a signal according to the position of the slider 18 in the left-and-right direction of the multi-directional switch 11 is output from the connector portion 16.

The annular coil spring 17 arranged within the accommodation space 30 at this time is compressed by a portion of an inner peripheral surface of the accommodation space 30, that is, a portion of an inner peripheral surface left portion 18h of the recess 18f of the slider 18, and an inner peripheral surface right portion 14d of the recess 14b of the lower case 14.

When the operating force applied to the operating portion 15 is released, the annular coil spring 17 will return to its original shape due to an elastic restoring force, and pushes back the inner peripheral surface left portion 18h of the recess 18f leftward. As a result, the slider 18 slides leftward within the sliding space 35, and returns to its initial state shown in FIG. 4A.

Similarly, when a forward operating force is applied to the operating portion 15, the slider 18 slides forward within the sliding space 35. The operating portion 15 abuts against the insertion groove 21a of the first slide terminal 21, and moves the first slide terminal 21 forward. The contact 21b provided on the first slide terminal 21 slides on the conductive pattern (not shown) formed on the circuit board 20, and a signal according to the position of the slider 18 in the front-and-rear direction of the multi-directional switch 11 is output from the connector portion 16.

The annular coil spring 17 arranged within the accommodation space 30 at this time is compressed by a portion of the inner peripheral surface of the accommodation space 30, that is, an inner peripheral surface rear portion of the recess 18f of the slider 18, and an inner peripheral surface front portion of the recess 14b of the lower case 14.

When the operating force applied to the operating portion 15 is released, the annular coil spring 17 will return to its original shape due to an elastic restoring force, and pushes back the inner peripheral surface rear portion of the recess 18f rearward. As a result, the slider 18 slides rearward within the sliding space 35, and returns to its initial state shown in FIG. 4A.

When the direction of the operating force applied to the operating portion 15 is an oblique direction, the slider 18 slides in the oblique direction within the sliding space 35. The operating portion 15 moves the first slide terminal 21 and the second slide terminal 22, respectively, by distances according to the component forces of the operating force in the front-and-rear direction and the left-and-right direction, and a signal according to the position of the slider 18 is output from the connector portion 16.

The annular coil spring 17 arranged within the accommodation space 30 at this time is compressed by a rear portion in an operational direction in the inner peripheral surface of the recess 18l of the slider 18, and a front portion in the operational direction in the inner peripheral surface of the recess 14b of the lower case 14.

When the operating force applied to the operating portion 15 is released, the annular coil spring 17 will return to its original shape due to an elastic restoring force, and pushes back the rear portion in the operational direction in the inner peripheral surface of the recess 18f to a direction opposite to the operational direction. As a result, the slider 18 slides in the direction opposite to the operational direction within the sliding space 35, and returns to its initial state shown in FIG. 4A.

In the present embodiment, the corner 14c that forms the opening edge of the recess 14b of the lower case 14 and the corner 18g that forms the opening edge of the recess 18f of the slider 18 are made right-angled. Therefore, the annular coil spring 17 compressed by being housed in the accommodation space 30 can be prevented from riding over the opening edges of the respective recesses and coming out during sliding of the slider 18, and a stable elastic restoring force can be applied to the slider 18.

According to the configuration of the present embodiment, the annular coil spring 17 as an elastic member is not arranged between the outer peripheral surface of the slider 18 and an inner surface 35a of the sliding space 35, and the movable distance of the slider 18 can be extended until the outer peripheral surface of the slider 18 and the inner surface 35a of the sliding space 35 abut against each other. That is, the operational amount (stroke) of the operating portion 15 can be made as large as possible. The dimension of the opening 12b formed in the upper case 12 may be determined according to the stroke of the operating portion 15 that is determined in this way.

Additionally, since the annular coil spring 17 entirely compressed by the operation of the operating portion 15 is used as an elastic member, the stress to be generated can be decentralized to the entire annular coil spring 17. Hence, a maximum stress value becomes low, and a structure that does not easily break due to fatigue can be provided. Moreover, since the allowed deformation volume of the elastic member can be made large, this also contributes to stroke extension of the operating portion 15.

Additionally, as compared to a configuration in which the elastic member is provided between the outer peripheral surface of the slider and the inner surface of the sliding space, when the operational amount (stroke) is made the same, the external diameter of the slider 18 can be enlarged by the dimension of the elastic member, and the distance between the outer peripheral surface of the slider 18 and the inner surface 35a of the sliding space 35 can be shortened. This contributes to enhancing the operativity of the operating portion 15. The reason will be described below.

In order to make the slider 18 slide smoothly within the sliding space 35, a slight gap is provided between the upper peripheral wall 18c of the slider 18 and a lower surface 13d (a ceiling surface of the sliding space 35) of the middle case 13.

Figure 5A:
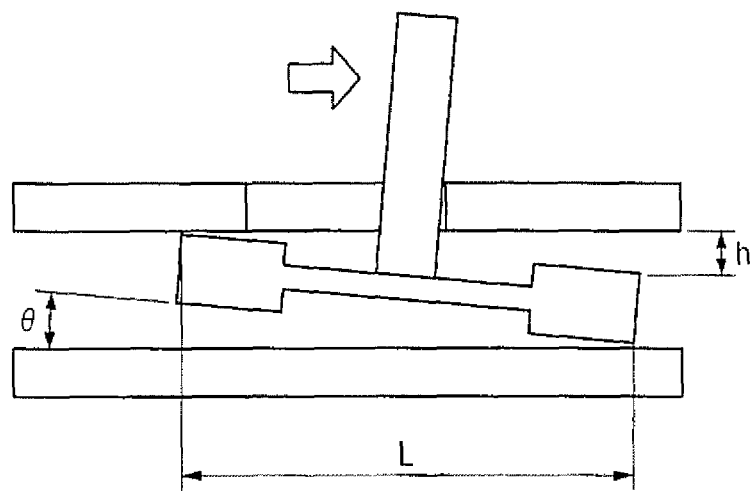
FIGS. 5A and 5B are views for explaining the operativity of the multi-directional switch of FIG. 1.

FIG. 5A is a view for explaining rattling caused when an operating force is applied to the slider in the configuration having such a gap. When the dimension of the gap is h and the length (holding length of the slider) between places where the slider abuts against the upper and lower housings is L, the amount θ of rattling can be expressed by $\tan^{-1}(h/L)$. That is, as L is longer, the amount of rattling can be made to be smaller.

Figure 5B:
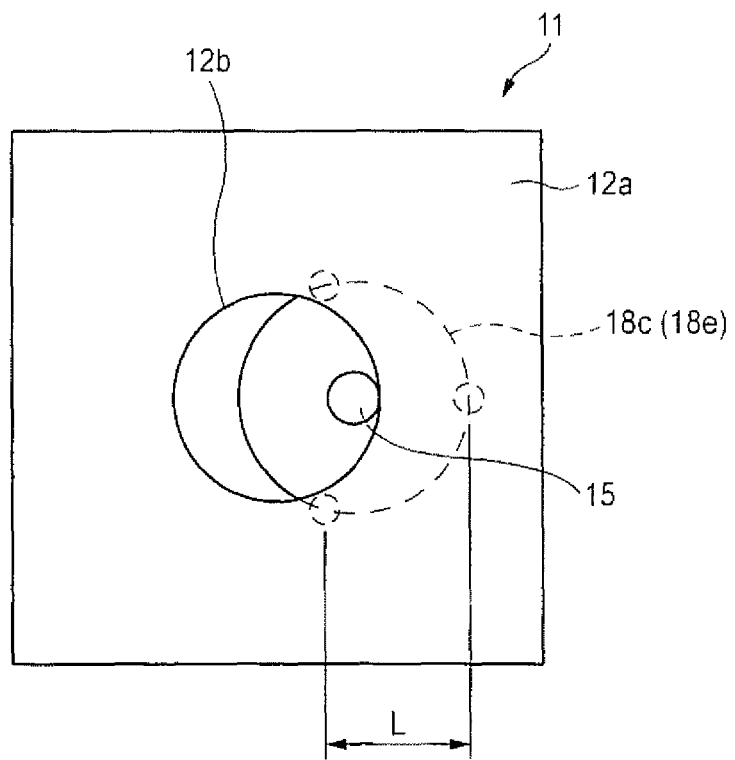

According to the configuration of the present embodiment, the outer peripheral surface of the slider 18 can be brought as close as possible to the inner surface 35a of the sliding space 35 during the operation of the operating portion 15 by extending the stroke or by enlarging the external diameter of the slider 18. Therefore, as shown in FIG. 5B, the length between the places where the upper peripheral wall 18c and the lower peripheral wall 18e of the slider 18 abut against the middle case 13 and the lower case 14, that is, the holding length L of the slider 18, can be made as large as possible.

Accordingly, the rattling within the sliding space 35 of the slider 18 during the operation of the operating portion 15 can be made as small as possible. This means that the operativity of the multi-directional switch 11 is improved.

Figure 6:
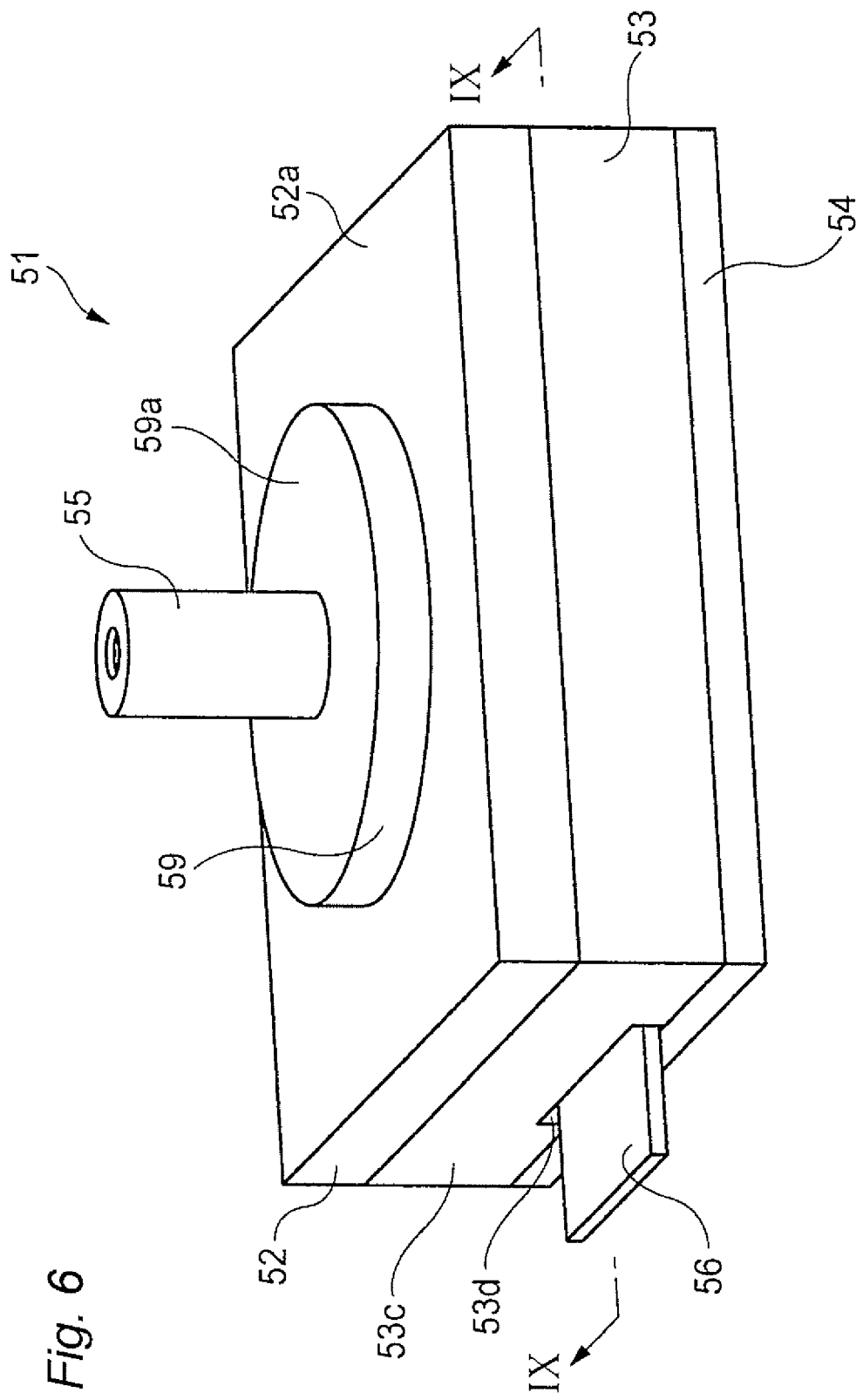
FIG. 6 is a perspective view showing the outer shape of a multi-directional switch related to a second embodiment of the invention.

FIG. 6 is a perspective view showing the outer shape of a multi-directional switch 51 related to a second embodiment of the invention. In the multi-directional switch 51, an upper case 52, a middle case 53, and a lower case 54 are stacked to form a rectangular parallelepiped-shaped main body.

An upper slider 59 is arranged on a top plate 52a of the upper case 52, and an operating portion 55 extends upward from an upper surface 59a of the upper slider 59. The operating portion 55 is a portion to which an operating force exerted by a user is directly or indirectly input.

A left side surface 53c of the middle case 53 is formed with a rectangular opening 53d, and a connector portion 56 extends laterally from the opening 53d. The connector portion 56 is provided with an external connection terminal (not shown).

Figure 7:
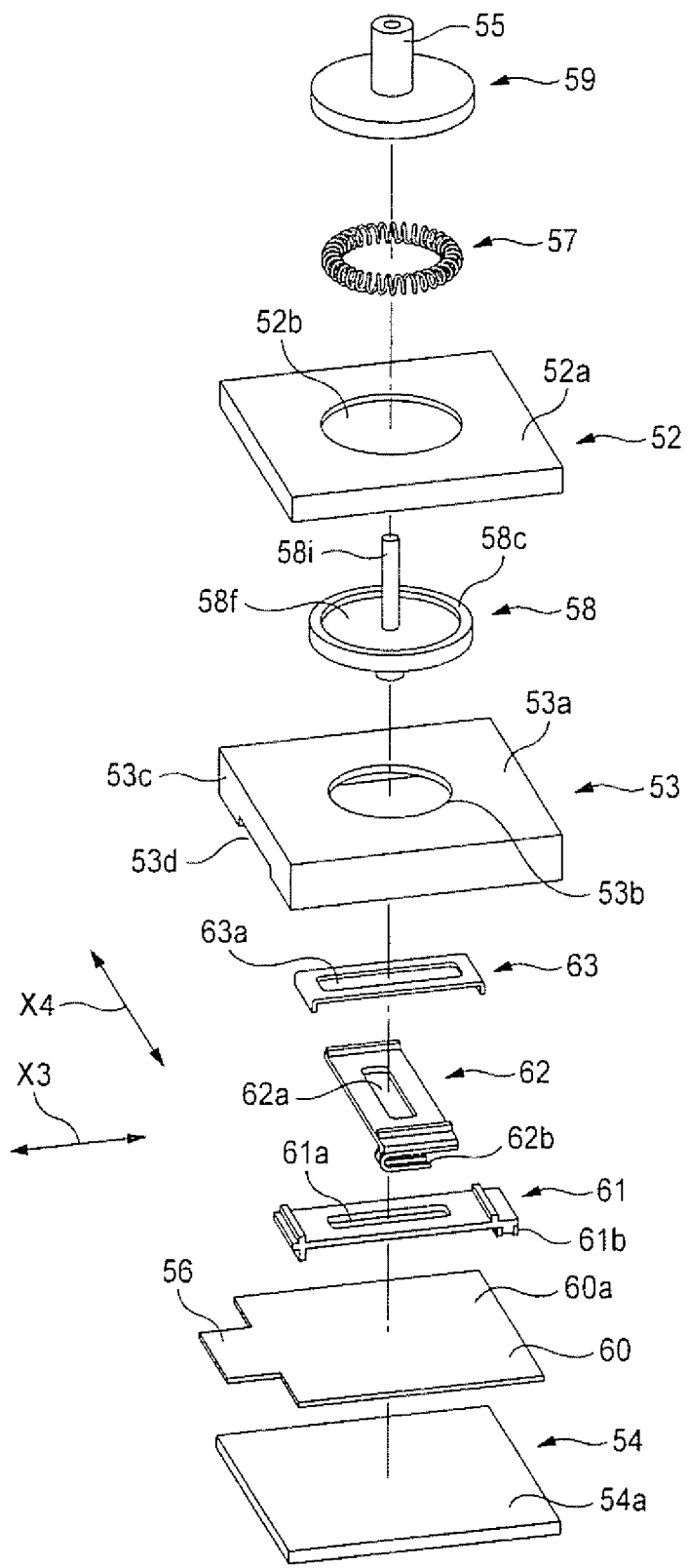
FIG. 7 is an exploded perspective view showing the internal configuration of the multi-directional switch of FIG. 6.

Next, the internal configuration of the multi-directional switch 51 will be described with reference to FIGS. 7 to 9B. As shown in FIG. 7, the multi-directional switch 51 further includes an annular coil spring 57, a lower slider 58, a circuit board 60, a first slide terminal 61, a second slide terminal 62, and a holding member 63.

Figure 8A:
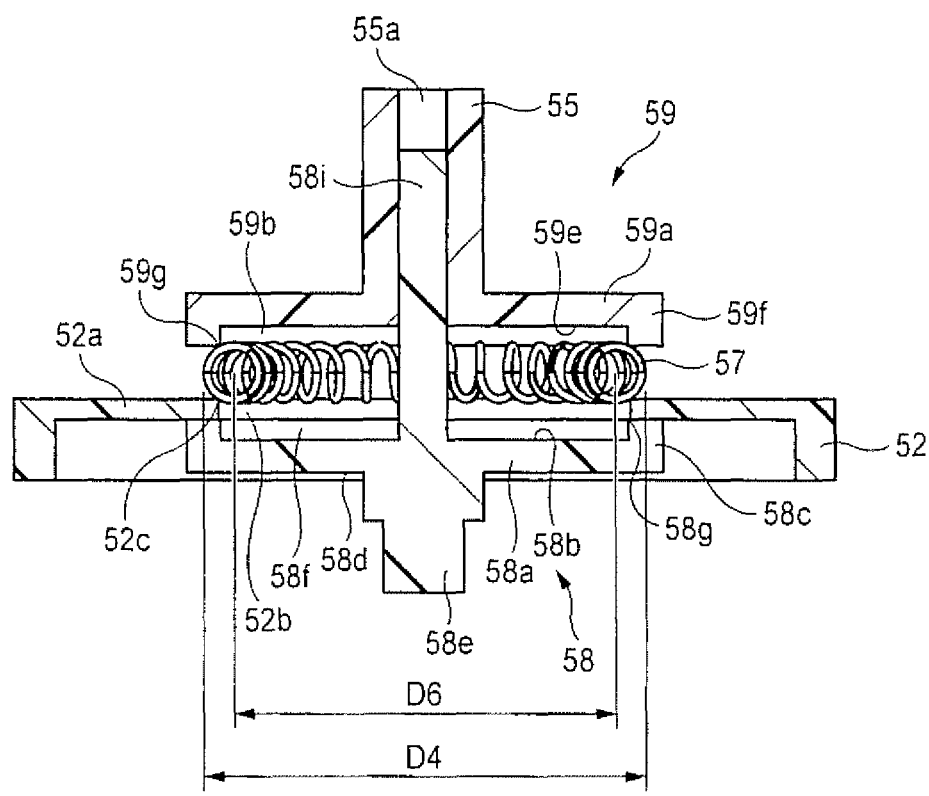
FIGS. 8A and 8B are longitudinal cross-sectional views illustrating a method of mounting an annular coil spring in the multi-directional switch of FIG. 6.

As shown in FIG. 7 and FIG. 8A, the upper slider 59 has a disk-like main body 59a. An outer peripheral portion of a lower surface 59e of the main body 59a protrudes downward to form a peripheral wall 59f. A bottomed recess 59b having a circular shape in a plan view is defined on a lower surface 59e side by the peripheral wall 59f.

The annular coil spring 57 has an annular outer shape by coupling both ends of a compression coil spring, and is formed so as to have a circular outer edge.

The lower slider 58 has a disk-like main body 58a. A fitting shaft 58i extends upward from an upper surface 58b of the main body 58a. The fitting shaft 58i is fitted into a fitting hole 55a formed in the operating portion 55. An outer peripheral portion of the upper surface 58b protrudes upward to form a peripheral wall 58c. A bottomed recess 58f having a circular shape in a plan view is defined on an upper surface 58b side by the peripheral wall 58c. An operating shaft 58e extends downward from a central portion of the lower surface 58d of the main body 58a.

Figure 8B:
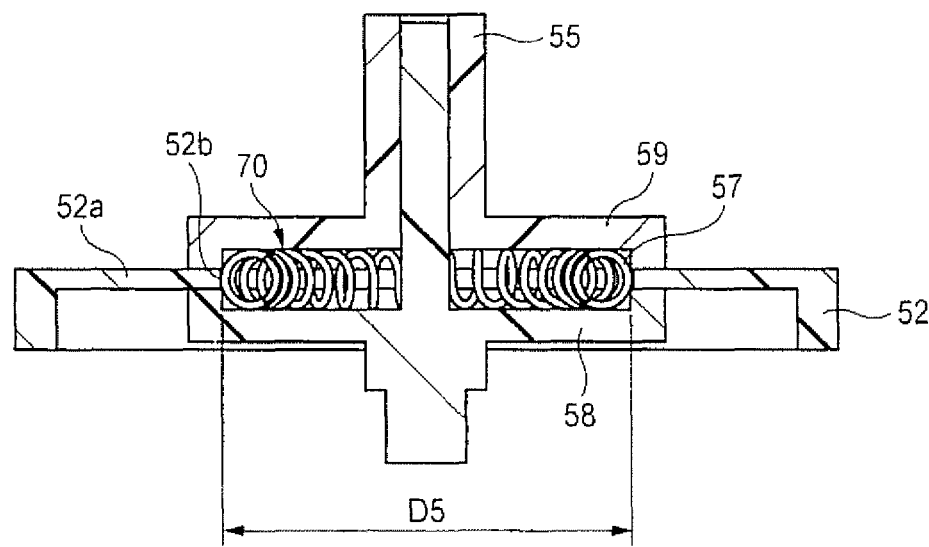

As shown in FIG. 8B, as the lower slider 58 as the first slider of the invention and the upper slider 59 as the second slider of the invention are arranged so as to sandwich a portion including an opening 52b in the upper case 52 as a housing of the invention, an accommodation space 70 is defined between the upper slider 59 and the lower slider 58 by the recess 59b and the recess 58f. Additionally, an inner peripheral edge of the opening 52b of the upper case 52 also constitutes a portion of the accommodation space 70. The annular coil spring 57 as an elastic member of the invention is arranged within the accommodation space 70.

In addition, as shown in FIG. 8A, the annular coil spring 57 has an external diameter D4 in a state where the annular coil spring is not arranged in the accommodation space 70. Also, as shown in FIG. 8B, the accommodation space 70 has an external diameter D5 smaller than the external diameter D4 of the annular coil spring 57. The external diameter D5 refers to the diameter in the accommodation space 70 having a circular shape in a plan view. In other words, the external diameter refers to the width dimension of the accommodation space 70 in a sliding direction of the lower slider 58 to be described below.

Additionally, the annular coil spring 57 has a center diameter D6 in a state where the annular coil spring is not arranged in the accommodation space 70. The center diameter D6 refers to the length of a line segment that passes through the center of the annular coil spring 57 and connects the turning centers of portions around which the spring turns annularly.

Additionally, a corner 59g that forms an opening edge of the recess 59b as a first recess of the invention is made right-angled. Additionally, a corner 52c that forms the edge of the opening 52b of the upper case 52 is also made right-angled. Moreover, a corner 58g that forms an opening edge of the recess 58l as a second recess of the invention is also made right-angled.

In order to arrange the annular coil spring 57 within the accommodation space 70, first, as shown in FIG. 8A, the annular coil spring 57 is placed above the opening 52b of the upper case 52. Since the external diameter D4 of the annular coil spring 57 in this state is greater than the external diameter D5 of the accommodation space 70, that is, the external diameter of the opening 52b, the annular coil spring 57 is arranged so as to cover the corner 52c of the opening 52b.

Next, the annular coil spring 57 is pressed down by the upper slider 59 from above. Since the external diameter D4 of the annular coil spring 57 in this state is greater than the external diameter D5 of the accommodation space 70, that is, the external diameter of the recess 59b, the corner 59g of the recess 59b abuts against an upper portion of the annular coil spring 57.

As the upper slider 59 is pushed down, the annular coil spring 57 is inwardly compressed while being sandwiched by the corner 59g of the recess 59b and the corner 52c of the opening 52b, and is arranged within the accommodation space 70 defined by the recess 59b and the recess 58f.

Since the center diameter D6 of the annular coil spring 57 is smaller than the external diameter D5 of the accommodation space 70, the annular coil spring 57 sandwiched between the corner 52c and the corner 59c can be made to slide easily within the accommodation space 70. Since the arrangement of the annular coil spring 57 to the accommodation space 70 is completed only by the work of pressing the upper slider 59 against the annular coil spring 57 placed on the top plate 52a of the upper case 52, workability can be substantially improved.

Figure 9A:
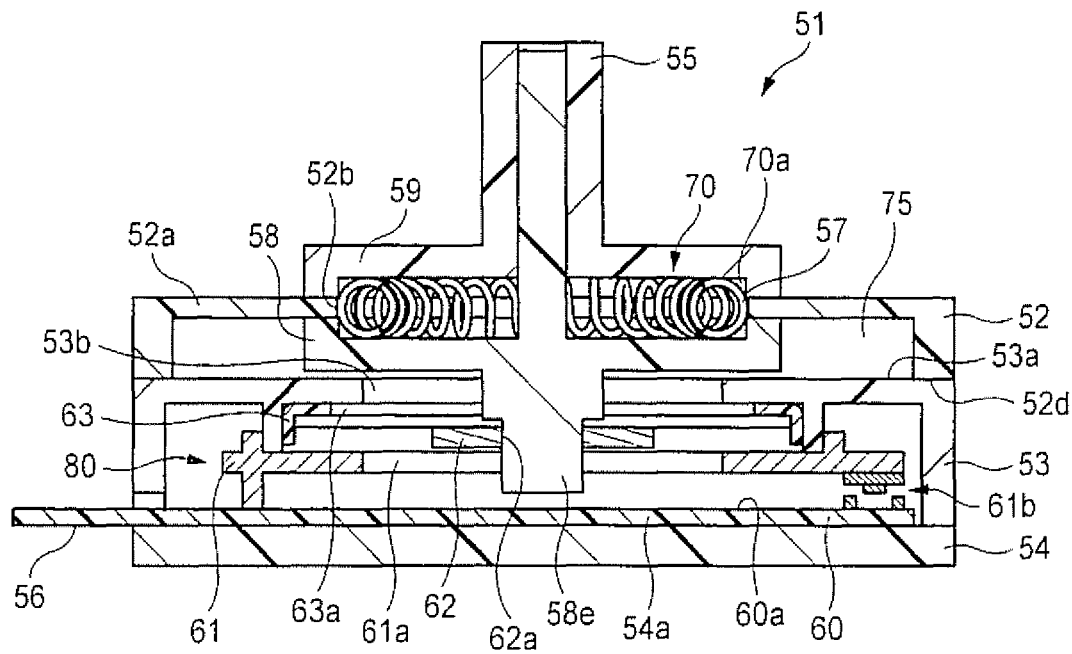
FIGS. 9A and 9B are longitudinal cross-sectional views taken along line IX-IX of FIG. 6, and illustrates the operation of the multi-directional switch.

As shown in FIG. 7, an upper surface 53a of the middle case 53 is formed with an opening 53b having a circular shape in a plan view. As shown in FIG. 9A, as a lower end face 52d of the upper case 52 is arranged on the upper surface 53a of the middle case 53, the middle case 53 defines a sliding space 75 between the middle case and the upper case 52.

The lower slider 58 is arranged within the sliding space 75 except for a portion of the fitting shaft 58i, and is configured to be two-dimensionally slidable within the sliding space 75 in response to an operating force applied to the operating portion 55. A portion of the operating shaft 58e protrudes to the underside of the middle case 53 through the opening 53b.

As shown in FIG. 7 and FIG. 9A, the circuit board 60 is arranged on an upper surface 54a of the lower case 54. A portion of the circuit board 60 serves as the connector portion 56, and a circuit electrically connected to the external connection terminal provided at the connector portion 56 is mounted on an upper surface 60a of the circuit board 60.

As shown in FIGS. 7 and 9A, the first slide terminal 61 is an elongated member arranged so as to extend in a left-and-right direction X3 of the multi-directional switch 51 above the circuit board 60. The first slide terminal 61 is formed with an insertion groove 61a extending in a longitudinal direction of the first slide terminal. Additionally, a conductive contact 61b is provided on a lower surface of one end in the longitudinal direction of the first slide terminal 61.

As shown in FIG. 7, the second slide terminal 62 is an elongated member arranged so as to extend in a front-and-rear direction X4 of the multi-directional switch 51 above the first slide terminal 61. The second slide terminal 62 is formed with an insertion groove 62a extending in a longitudinal direction of the second slide terminal. Additionally, a conductive contact 62b is provided on a lower surface of one end in the longitudinal direction of the second slide terminal 62.

The holding member 63 is an elongated member arranged so as to extend in the left-and-right direction X3 of the multi-directional switch 51 above the second slide terminal 62. The fixing member 63 is formed with an insertion groove 63a extending in a longitudinal direction of the fixing member. In a state where the holding member 23 is held within the middle case 53, an inner edge of the insertion groove 63a is arranged so as to face a flat portion (not shown) formed at the operating shaft 58e, and regulates a movement around the axis of the operating shaft 58e.

In an assembled state of the multi-directional switch 51 shown in FIG. 9A, the first slide terminal 61 is supported within the middle case 53 so as to be movable in the front-and-rear direction X4 of the multi-directional switch 51. Additionally, the second slide terminal 62 is supported within the middle case 53 so as to be movable in the left-and-right direction X3 of the multi-directional switch 51. The operating shaft 58e extends downward through the insertion groove 61a of the first slide terminal 61, the insertion groove 62a of the second slide terminal 62, and the insertion groove 63a of the holding member 63, and faces the upper surface 60a of the circuit board 60.

As the operating member 55 is operated in the front-and-rear direction X4 of the multi-directional switch 51, the operating shaft 58e abuts against an inner edge of the insertion groove 61a formed in the first slide terminal 61, and moves the first slide terminal 61 in the front-and-rear direction X4 of the multi-directional switch 51. The contact 61b of the first slide terminal 61 slides on the conductive pattern (not shown) formed on the upper surface 60a of the circuit board 60, and a signal according to the position of the contact is output from the connector portion 56.

As the operating member 55 is operated in the left-and-right direction X3 of the multi-directional switch 51, the operating shaft 58e abuts against an inner edge of the insertion groove 62a formed in the second slide terminal 62, and moves the second slide terminal 62 in the left-and-right direction X3 of the multi-directional switch 51. The contact 62b of the second slide terminal 62 slides on the conductive pattern (not shown) formed on the upper surface 60a of the circuit board 60, and a signal according to the position of the contact is output from the connector portion 56.

That is, the circuit board 60, the first slide terminal 61, and the second slide terminal 62 function as a signal output unit 80 that outputs a signal according to the position of the lower slider 58 that slides two-dimensionally within the sliding space 75 by the operating force applied to the operating portion 55. The multi-directional switch 51 related to the present embodiment at this time functions as an operation input device that outputs a signal according to an operation input to the operating portion 55.

Next, the operation of the multi-directional switch 51 related to the present embodiment will be described, referring to FIGS. 9A to 10.

As shown in FIG. 9A, in a state where no operating force is applied to the operating portion 55, that is, the lower slider 58, the outer edge of the annular coil spring 57 compressed and arranged within the accommodation space 70 abuts against an inner peripheral surface 70*a* of the accommodation space 70 and an inner peripheral edge of the opening 52*b*.

Figure 9B:
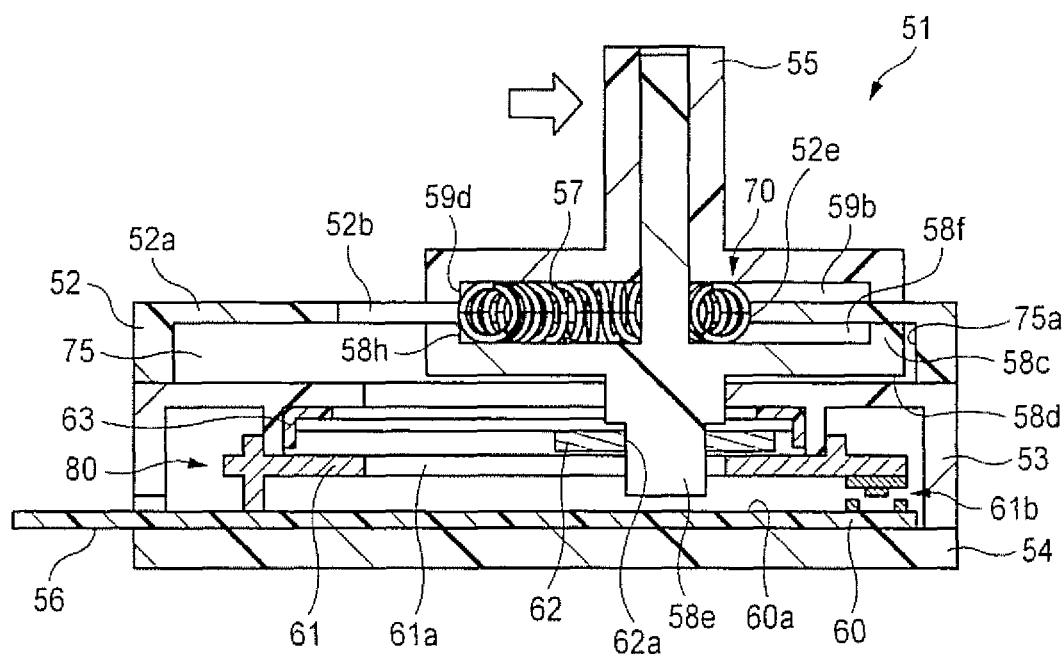
Figure 10:
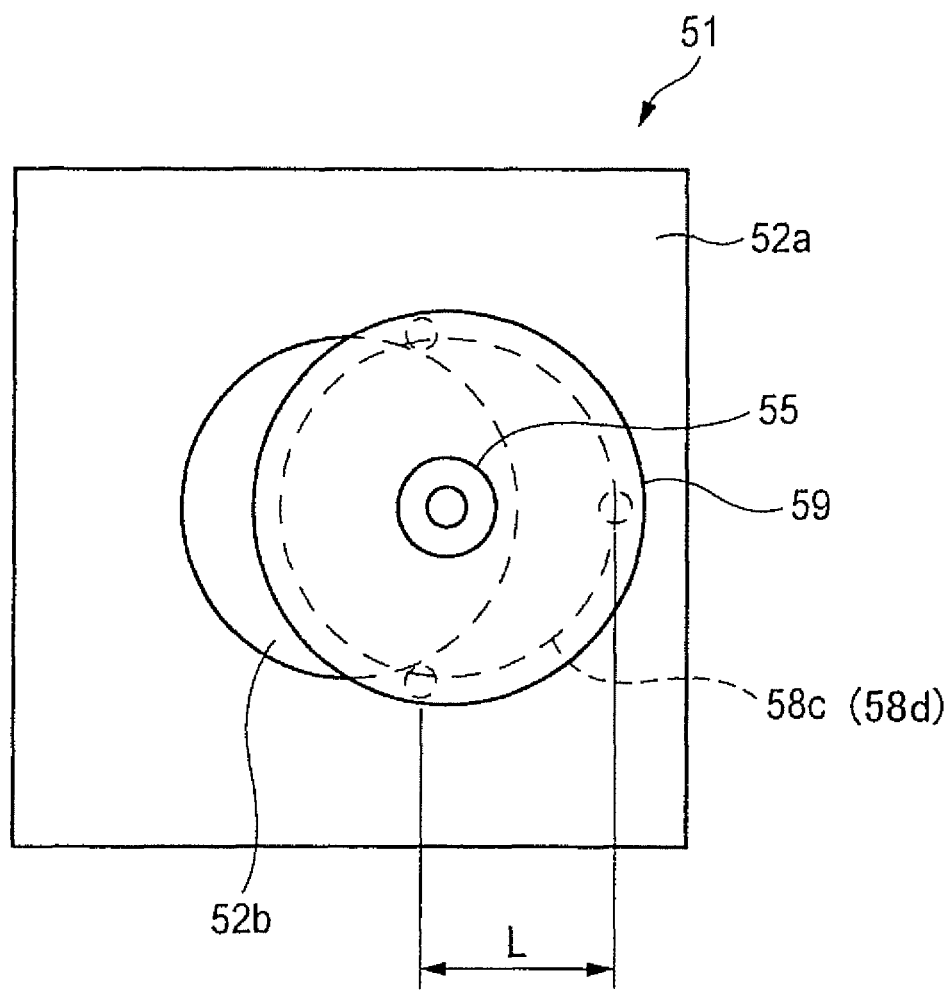
FIG. 10 is a view for explaining the operativity of the multi-directional switch of FIG. 6.

As shown in FIG. 9B, when a rightward operating force is applied to the operating portion 55, the lower slider 58 slides rightward within the sliding space 75. The operating shaft 58*e* abuts against the insertion groove 62*a* of the second slide terminal 62, and moves the second slide terminal 62 rightward. The contact 62*b* provided on the second slide terminal 62 slides on the conductive pattern (not shown) formed on the circuit board 60, and a signal according to the position of the lower slider 58 in the left-and-right direction of the multi-directional switch 51 is output from the connector portion 56.

The annular coil spring 57 arranged within the accommodation space 70 at this time is compressed by a portion of an inner peripheral surface of the accommodation space 70, that is, an inner peripheral surface left portion 58*h* of the recess 58*f* of the lower slider 58, an inner peripheral surface left portion 59*d* of the recess 59*b* of the upper slider 59, and an inner peripheral edge right portion 52*e* of the opening 52*b* of the upper case 52.

When the operating force applied to the operating portion 55 is released, the annular coil spring 57 will return to its original shape due to an elastic restoring force, and pushes back the inner peripheral surface left portion 58*h* of the recess 58*f* and the inner peripheral surface left portion 59*d* of the recess 59*b* leftward. As a result, the lower slider 58 slides leftward within the sliding space 75, and returns to its initial state shown in FIG. 9A.

Similarly, when a forward operating force is applied to the operating portion 55, the lower slider 58 slides forward within the sliding space 75. The operating shaft 58*e* abuts against the insertion groove 62*a* of the second slide terminal 62, and moves the second slide terminal 62 forward. The contact 62*b* provided on the second slide terminal 62 slides on the conductive pattern (not shown) formed on the circuit board 60, and a signal according to the position of the lower slider 58 in the front-and-rear direction of the multi-directional switch 51 is output from the connector portion 56.

The annular coil spring 57 arranged within the accommodation space 70 at this time is compressed by a portion of an inner peripheral surface of the accommodation space 70, that is, an inner peripheral surface rear portion of the recess 58*f* of the lower slider 58, an inner peripheral surface rear portion of the recess 59*b* of the upper slider 59, and an inner peripheral edge front portion of the opening 52*b* of the upper case 52.

When the operating force applied to the operating portion 55 is released, the annular coil spring 57 will return to its original shape due to an elastic restoring force, and pushes back the inner peripheral surface rear portion of the recess 58*f* and the inner peripheral surface rear portion of the recess 59*b* rearward. As a result, the lower slider 58 slides rearward within the sliding space 75, and returns to its initial state shown in FIG. 9A.

When the direction of the operating force applied to the operating portion 55 is an oblique direction, the slider 58 slides in the oblique direction within the sliding space 75. The operating shaft 58*e* moves the first slide terminal 61 and the second slide terminal 62, respectively, by distances according to the component forces of the operating force in the front-and-rear direction and the left-and-right direction, and a signal according to the position of the lower slider 58 is output from the connector portion 56.

The annular coil spring 57 arranged within the accommodation space 70 at this time is compressed by a rear portion in an operational direction in the inner peripheral surface of the recess 58*f* of the lower slider 58, a rear portion in the operational direction in the inner peripheral surface of the recess 59*b* of the upper slider 59, and a front portion in the operational direction in the inner peripheral edge of the opening 52*b* of the upper case 52.

When the operating force applied to the operating portion 55 is released, the annular coil spring 57 will return to its original shape due to an elastic restoring force, and pushes back the rear portion in the operational direction in the inner peripheral surface of the recess 58*f*, and the rear portion in the operational direction in the inner peripheral surface of the recess 59*b* in a direction opposite to the operational direction. As a result, the lower slider 58 slides in the direction opposite to the operational direction within the sliding space 75, and returns to its initial state shown in FIG. 9A.

In the present embodiment, the corner 59*g* that forms an opening edge of the recess 59*b* of the upper slider 59, the corner 52*c* that forms the edge of the opening 52*b* of the upper case 52, and the corner 58*g* that forms the opening edge of the recess 58*f* of the lower slider 58 are made right-angled. Accordingly, the annular coil spring 57 compressed by being housed in the accommodation space 70 can be prevented from riding over the opening edges of the respective recesses and coming out during sliding of the upper slider 59 and the lower slider 58, and a stable elastic restoring force can be applied to the upper slider 59 and the lower slider 58.

According to the configuration of the present embodiment, the annular coil spring 57 as an elastic member is not arranged between the outer peripheral surface of the lower slider 58 and an inner surface 75*a* of the sliding space 75, and the movable distance of the lower slider 58 can be extended until the outer peripheral surface of the lower slider 58 and the inner surface 75*a* of the sliding space 75 abut against each other. That is, the operational amount (stroke) of the operating portion 55 can be made as large as possible. The dimension of the opening 52*b* formed in the upper case 52 may be determined according to the stroke of the operating portion 55 that is determined in this way.

Additionally, since the annular coil spring 57 compressed as a whole by the operation of the operating portion 55 as an elastic member is used, the stress to be generated can be decentralized to the entire annular coil spring 57. Hence, a maximum stress value becomes low, and a structure that does not easily break due to fatigue can be provided. Moreover, since the allowed deformation volume of the elastic member can be made large, this also contributes to stroke extension of the operating portion 55.

Additionally, as compared to a configuration in which the elastic member is provided between the outer peripheral surface of the slider and the inner surface of the sliding space, when the operational amount (stroke) is made the same, the external diameter of the lower slider 58 can be enlarged by the dimension of the elastic member, and the distance between the outer peripheral surface of the lower slider 58 and the inner surface 75*a* of the sliding space 75 can be shortened. This contributes to enhancing the operativity of the operating portion 55. The reason will be described below.

In order to make the lower slider 58 slide smoothly within the sliding space 75, a slight gap is provided between the lower surface 58*d* of the lower slider 58 and an upper surface 53*a* (a bottom surface of the sliding space 75) of the middle case 53.

According to the configuration of the present embodiment, the outer peripheral surface of the lower slider 58 can be brought as close as possible to the inner surface 75*a* of the sliding space 75 during the operation of the operating portion 55 by extending the stroke or by enlarging the external diameter of the lower slider 58. Therefore, as shown in FIG. 10, the length between the places where the peripheral wall 58*c* and the lower surface 58*d* of the lower slider 58 abut against the upper case 52 and the middle case 53, that is, the holding length L of the lower slider 58, can be made as large as possible.

Accordingly, as described with reference to FIG. 5A, the rattling within the sliding space 75 of the lower slider 58 during the operation of the operating portion 55 can be made as small as possible. This means that the operativity of the multi-directional switch 51 is improved.

Additionally, according to the configuration of the present embodiment, the opening 52*b* of the upper case 52 is covered with the upper slider 59, at least in a state where no operating force is applied to the operating portion 55, that is, the lower slider 58. For this reason, entering of dust or the like into the main body from the opening 52*b* can be prevented as much as possible. Additionally, according to the configuration of the present embodiment, since the signal output unit 80 can be arranged below the sliding space 75, electric circuit parts of the signal output unit 80 can be more reliably protected from the entering of dust or the like.

The above embodiments are merely for facilitating the understanding of the invention and are not for limiting the invention. It is apparent that the invention may be modified and improved without departing from the spirit thereof and the equivalents thereof are included in the invention.

In the multi-directional switch 11 related to the first embodiment, the elastic member is not necessarily the annular coil spring 17. An O-ring and a disk-like member made of rubber, elastomer, or the like can be adopted if these have a circular outer edge. The same applies for the annular coil spring 57 in the multi-directional switch 51 related to the second embodiment.

In the multi-directional switch 11 related to the first embodiment, the recess 14*b* of the lower case 14 and the recess 18*f* of the slider 18 that define the accommodation space 30 do not necessarily have a circular shape in a plan view. If the accommodation space 30 has a point-symmetrical shape in a plan view, it is also possible to form the respective recesses into a polygonal shape. Additionally, if a frame body capable of holding the annular coil spring 17 in each recess is provided and the frame body has a point-symmetrical shape in a plan view, the shape of the respective recesses themselves is arbitrary.

In the multi-directional switch 51 related to the second embodiment, the recess 59*b* of the upper slider 59, the recess 58*f* of the lower slider 58, and the opening 52*b* of the upper case 52 that define the accommodation space 70 do not necessarily have a circular shape in a plan view. If the accommodation space 70 has a point-symmetrical shape in a plan view, it is also possible to form the respective recesses and the opening 52*b* into a polygonal shape. Additionally, if a frame body capable of holding the annular coil spring 57 in each recess is provided and the frame body has a point-symmetrical shape in a plan view, the shape of the respective recesses themselves is arbitrary.

In the multi-directional switch 51 related to the second embodiment, the accommodation space 70 is not necessarily defined by the recess 59*b* of the upper slider 59 and the recess 58*f* of the lower slider 58. If an accommodation space can be defined between the upper slider 59 and the lower slider 58 so as to include the opening 52*b*, a configuration that either the upper slider or the lower slider has a recess can be adopted.

The present application is based on Japanese Patent Application No. 2011-289813 filed on Dec. 28, 2011, the content of which is incorporated herein by reference.

The invention claimed is:

1. A multi-directional switch comprising:
   a first housing;
   a second housing defining a sliding space between the second housing and the first housing;
   a slider, having at least a portion arranged within the sliding space, and configured to slide in two dimensions within the sliding space in response to an operating force; and
   an elastic member having a circular outer edge,
   wherein the first housing and the slider defines an accommodation space having a point-symmetrical shape therebetween,
   wherein the elastic member is arranged within the accommodation space,
   wherein the outer edge of the elastic member abuts against an inner peripheral surface of the accommodation space in a state where no operating force is applied to the slider,
   wherein the elastic member is compressed by a portion of the inner peripheral surface of the accommodation space as the slider slides within the sliding space,
   wherein the elastic member has an annular outer shape which extends in a plane defined by the two dimensions, and
   wherein the slider has an outer peripheral portion on a lower surface which protrudes downward to form a lower peripheral wall having an annular shape, wherein the first housing and the lower peripheral wall of the slider define an accommodation space having a circular shape therebetween.

2. The multi-directional switch according to claim 1, wherein the elastic member is an annular coil spring.

3. The multi-directional switch according to claim 2, wherein a center diameter of the annular coil spring in a state where the annular coil spring is not arranged within the accommodation space is smaller than a width dimension of the accommodation space in a sliding direction of the slider.

4. The multi-directional switch according to claim 1, wherein the elastic member has a first width dimension in a state where the elastic member is not arranged within the accommodation space,
   wherein the accommodation space has a second width dimension smaller than the first width dimension in a sliding direction of the slider,
   wherein the accommodation space is defined by a first recess formed in the first housing and a second recess formed in the slider, and
   wherein corners that form opening edges of the first recess and the second recess are right-angled, respectively.

5. An operation input device comprising:
   the multi-directional switch according to claim 1, and a signal output unit that outputs a signal according to a position of the slider.

6. A multi-directional switch comprising:

a housing having an opening having a point-symmetrical shape;

a first slider, having at least a portion arranged within the housing, and configured to slide in two dimensions in response to an operating force;

a second slider arranged out of the housing and sandwiching a portion of the housing including the opening together with the first slider; and an elastic member having a circular outer edge, wherein the first slider and the second slider define an accommodation space having a point-symmetrical shape therebetween, wherein the elastic member is arranged within the accommodation space, wherein the outer edge of the elastic member abuts against an inner peripheral surface of the accommodation space and an inner peripheral edge of the opening in a state where no operating force is applied to the first slider, wherein the elastic member is compressed by a portion of the inner peripheral surface of the accommodation space and the inner peripheral edge of the opening as the first slider slides within the sliding space, wherein the elastic member has an annular outer shape which extends in a plane defined by the two dimensions, and wherein the slider has an outer peripheral portion on a lower surface which protrudes downward to form a lower peripheral wall having an annular shape, wherein the first housing and the lower peripheral wall of the slider define an accommodation space having a circular shape therebetween.

7. The multi-directional switch according to claim 6, wherein the elastic member is an annular coil spring.

8. The multi-directional switch according to claim 7, wherein a center diameter of the annular coil spring in a state where the annular coil spring is not arranged within the accommodation space is smaller than a width dimension of the accommodation space in a sliding direction of the first slider.

9. The multi-directional switch according to claim 6, wherein the elastic member has a first width dimension in a state where the elastic member is not arranged within the accommodation space, wherein the accommodation space has a second width dimension smaller than the first width dimension in a sliding direction of the first slider, wherein the accommodation space is defined by a first recess formed in the first slider and a second recess formed in the second slider, and wherein corners that form an opening edge of the second recess and an edge of the opening of the housing are right-angled, respectively.

10. The multi-directional switch according to claim 6, wherein the opening of the housing is covered with the second slider in a state where no operating force is applied to at least the first slider.

11. An operation input device comprising:

the multi-directional switch according to claim 6, and a signal output unit that outputs a signal according to a position of the first slider.

* * * * *